Nov. 10, 1959     G. V. P. TOTTEN ET AL     2,911,901
COFFEE MAKING APPARATUS

Filed Sept. 25, 1956     2 Sheets-Sheet 1

INVENTOR.
GILBERT V.P. TOTTEN
BY DALE D. GRABER

ATTORNEYS

Nov. 10, 1959     G. V. P. TOTTEN ET AL     2,911,901
COFFEE MAKING APPARATUS
Filed Sept. 25, 1956     2 Sheets-Sheet 2
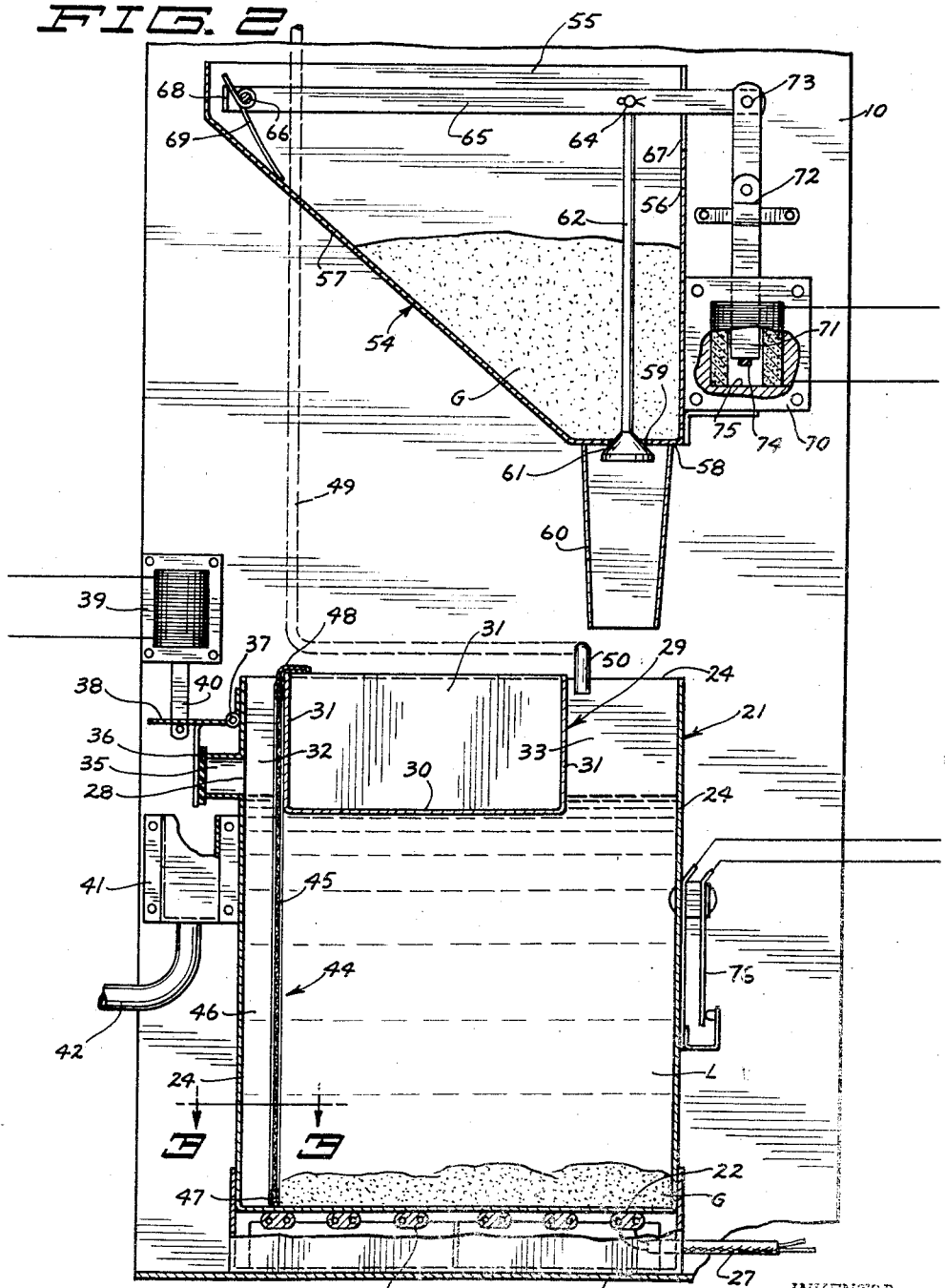
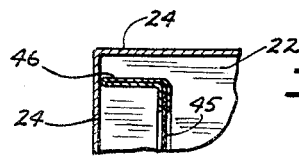
INVENTOR.
GILBERT V.P. TOTTEN
BY DALE D. GRABER
*Carlsen & Hayle*
ATTORNEYS United States Patent Office 2,911,901
Patented Nov. 10, 1959

2,911,901

COFFEE MAKING APPARATUS

Gilbert vP. Totten, and Dale D. Graber, Minneapolis, Minn., assignors, by mesne assignments, to Automatic Canteen Company of America, Chicago, Ill., a corporation of Delaware Application September 25, 1956, Serial No. 611,932

5 Claims. (Cl. 99—289)

This invention relates generally to an apparatus for preparing and dispensing fresh coffee and particularly concerns a device for continuously brewing, preserving, and dispensing liquid coffee to accommodate an intermittent demand over an extended priod of time.

Heretofore known coffee making and dispensing devices of the type designed to produce liquid coffee in large quantities have been found objectionable for one or more of many reasons. The majority of such devices lack automatic operation and require frequent service by the attendant. Others which require less attention have achieved such a status only through the use of a coffee powder or syrup which, while quickly dissolved in hot water, fail to provide a liquid coffee having taste and aroma comparable to coffee brewed from infusion of the ground coffee bean by pouring hot water thereon. In brief, while the so-called "pan coffee" has been found to be superior in quality and in economy of production, the art has not as yet provided an apparatus for making, maintaining and dispensing the same over an extended period of time.

The primary object of the present invention is to provide a coffee making apparatus adapted to produce coffee by steeping the ground coffee bean in hot water, maintaining the resultant brew at such a temperature as to preserve the flavor thereof, and dispense the coffee liquid in predetermined quantities as demand is placed upon the apparatus.

Another object of the invention is to provide an apparatus for making and preserving a reserve quantity of liquid coffee with dispensing means which when activated will discharge a predetermined amount from the reserve quantity and having means for automatically replenishing the reserve with coffee liquid ingredients to maintain the reserve at a constant quantity and quality throughout repeated activation of the discharge means.

Still another object of the invention is to provide a new and improved coffee making and dispensing apparatus having a reservoir of prepared coffee wherein the dispensing of coffee from the reservoir is controlled principally by the introduction of coffee ingredients to the reservoir to replace the amount dispensed.

With these and still additional objects in mind the invention broadly comprises an apparatus having a coffee making tank or reservoir, a heating device associated with the tank for maintaining the tank contents at a relatively constant temperature between 150° and 165° Fahrenheit, the tank having an elevated discharge opening in one wall thereof, a ground coffee hopper and a hot water supply source arranged to respectively introduce ground coffee and hot water into the tank in predetermined proportions and amounts to cause liquid coffee brew in the tank to overflow through the discharge opening, and barrier means intermediate the discharge opening and the place of introduction of the water and ground coffee prohibiting immediate discharge of the new ingredients.

The above mentioned and still other objects of the invention will be brought to light during the course of the following specification, reference being made to the accompanying drawings, in which—

Fig. 2 is a somewhat enlarged view similar to Fig. 1 with the hopper and coffee infusion tank shown in vertical section and other elements partially broken away for a clear understanding of the invention.

Fig. 3 is an enlarged fragmentary horizontal section taken on line 3—3 of Fig. 2.

Figure 1:
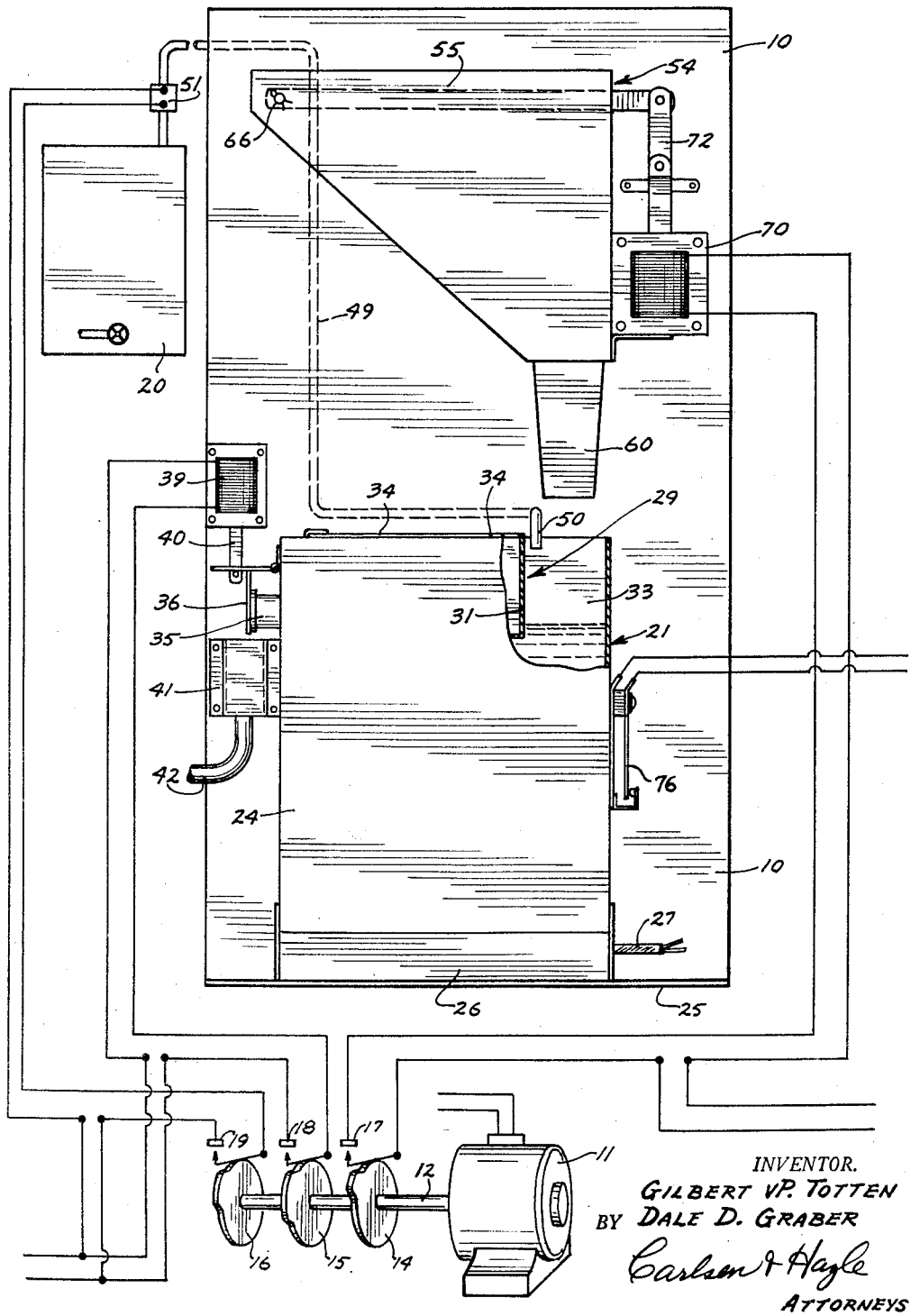
Fig. 1 is a front elevation of the important elements of the apparatus as removed from the enclosure or housing in which it would normally be installed and schematically showing the wiring diagram illustrative of the automatic electromechanical operation of the apparatus.

Referring now more particularly to the drawings reference numerals will be used to denote like parts and structural features in the different views. The apparatus is here shown as mounted on a panel 10 for simplicity of disclosure. This panel is representative of any suitable frame or supporting structure for mounting the apparatus within a housing designed to enclose the mechanism and give the over all machine an attractive exterior appearance. It will accordingly be understood that the mechanism shown in the drawings could be the internal structure of a coin operated vending machine for public use, a coffee maker for operation by hotel or restaurant employees, or any similar device where the function thereof is to produce and dispense coffee over a relatively long period of time.

Also suitably mounted within the cabinet is an electric motor 11 driving a shaft 12 which carries cams 14, 15 and 16 having peripheral projections as shown adapted to respectively engage and close switches 17, 18 and 19 during rotation of the cams with shaft 12 to close circuits to various valves as will subsequently be described. A water boiler, denoted diagrammatically at 20, is also provided for furnishing hot water to the apparatus. The boiler may be connected to a constant water supply source and is, of course, provided with means for heating water therein.

The apparatus mounted on panel 10 which performs the coffee making and dispensing operations will now be described in detail and in this connection attention is drawn particularly to Fig. 2. The coffee infusion tank is denoted generally by the numeral 21 and comprises a liquid containing box-shaped receptacle having a bottom 22 and upright front, rear and side walls 24 which jointly extend completely around and attach to the bottom. While not shown, the receptacle 21 is preferably rectangular in horizontal cross section. The receptacle 21 sits upon a horizontally disposed hot plate 26 mounted on ledge 25 affixed to the panel 10, the plate having coils in contact with the tank bottom 22 with lead 27 extending to an electricity source.

One of the side walls 24, in the upper portion thereof, is provided with a tank overflow or discharge port 28. Tank 21 is also provided with a partial cover member denoted generally at 29. This cover is box shaped with a deeply recessed bottom wall or tank covering portion 30 surrounded by upright walls 31. The cover has a fore and aft dimension such as to allow it to fit snugly between the front and rear walls 24 of the receptacle. It is, however, somewhat narrower than the receptacle 21 whereby, as it is placed in an intermediate position between the side walls 24, as shown in Fig. 2, a pair of vertically extending chimneys or chambers 32 and 33 will be formed in the upper portion of the receptacle interior, one at each side of the cover member 29. In view of the snug fit of fore and aft walls 31 against the receptacle walls 24, the chambers 32 and 33 are completely closed off from each other except through the interior of receptacle 24 beneath the cover wall 30. The upper edges of fore and aft walls 31 are provided with outwardly projecting flanges 34 adapted to rest upon the front and rear tank walls 24 to hold the cover member 29 in position. It is important to note that the bottom wall 30 of the member 29 is horizontally disposed at an elevation within the receptacle which is lower than the bottom of discharge port 28. Accordingly, the contents of the tank must necessarily rise part way in the chamber 32 before it can reach port 28.

A short tubular spout 35 surrounding the port 28 and serving as a port extension is attached to the tank side wall 24 to extend horizontally outward from the tank. The outer end of spout 35 is closed by a flap valve 36 hinged as at 37 to the tank and having a lift finger 38. A solenoid 39 mounted on the panel controls a vertically movable lifting link 40 which hooks under the finger 38. As the solenoid 39 is energized link 40 is pulled upwardly to swing the flap 36 to an open position away from the end of spout 35. An upwardly opening receptacle 41 having a bottom drain tube 42 is mounted directly below the extended end of spout 35 to receive any liquid discharged from the tank through port 28.

A filter screen is provided to extend downwardly within the tank 21 adjacent the port 28. This screen is denoted generally by the number 44 and comprises a sheet of fine mesh screening 45 encircled by rigid side frame members 46 connected by lower and upper cross members 47 and 48. The side members 46 extend outwardly at right angles to the sheet 45 (Fig. 3) to serve as spacers for holding the screen in spaced relation to the side wall 24. The upper cross member 48 is turned over at an angle to provide a grip for upward withdrawal of the filter from the tank. It will be observed that the frame member 47 is adapted to rest firmly against the tank bottom 22 and with the edges of bars 46 in engagement with the side wall the port 28 becomes isolated from the main area of the tank interior (to the right of the screen in Fig. 2) except through the mesh 45. The purpose of this filter and the particular construction used will be subsequently understood.

Turning now to the mechanism shown above the tank 21 in the drawings the means for supplying the tank with hot water and ground coffee will be described. A fluid supply line 49 having its discharge end 50 disposed over the tank for discharging water into the chamber 33 leads from the boiler 20. A normally closed electrically operated valve 51 is disposed in the line 49 which valve, when current is supplied thereto, will open to permit hot water to flow from the boiler through the line into the tank.

A hopper 54 for holding and dispensing ground coffee G is mounted on the panel 10 above the tank 21. The hopper is of a generally downwardly tapered construction with vertical front and rear walls 55, a vertical side wall 56, and an opposing side wall 57 which slopes downwardly and inwardly to a reduced bottom 58. The bottom 58 is provided with a circular opening 59 through which the contents of the hopper may discharge. The opening 59 is surrounded by an elongated downwardly projecting spout 60 which terminates short of the tank 21. It will be observed that the opening 59 and spout 60 are in vertical alignment with the tank filling chamber 33 which is upwardly exposed.

The hopper opening 59 is closed by a taper cone valve 61 having an elongated stem 62 which extends upwardly through the interior of the hopper. The upper end of stem 62 is pivotally connected as at 64 to a medial point on an elongated operating link 65 having one end journaled on a pin 66 mounted between the walls 55 of the hopper and its other end extending laterally out through a vertical slot 67 provided in the hopper wall 56. The terminal 68 of link 65 adjacent the pin 66 is angled outwardly and a wire spring 69 encircles pin 66 with its ends in engagement with the terminal 68 and slanting hopper wall 57 to urge the extended end portion of the link 65 upwardly about the pivot 66 and against the upper edge of slot 67. This is the normal position of link 65 and when so held under bias of spring 69 the valve 61 is seated upwardly against the hopper bottom 58 closing the opening 59. A solenoid 70 is mounted beside the hopper 36 and the movable armature 71 thereof is connected as by slidable linkage 72 with the extended end of link 65 as by pivot 73. A small bumper 74 of resilient material such as rubber is affixed to the bottom of the armature. It will be understood that when the solenoid 70 is energized the armature 71 will be moved downwardly to depress link 65 about its pivot and unseat valve 61 to allow the contents of the hopper to flow through the opening 59. Bumper 74 will bounce against the stop surface 75 to vibrate the valve and assure a flow of grounds G through the hopper discharge opening.

The current to solenoid 70 is controlled by the closing and opening of switch 17 operated by the cam 14. It is desirable that the cam 14 and valve opening 59 be so correlated as to allow only enough ground coffee for one cup of liquid coffee to be discharged upon each revolution of the shaft 12. The current to valve 51 is controlled by the closing and opening of switch 19 operated by cam 16. It is desirable that cam 16 and valve 51 be so correlated as to allow only enough hot water for one cup of liquid coffee to be discharged through line 49 upon each revolution of the shaft 12. Cams 14 and 16 are so arranged on the shaft as to energize the solenoid 70 and valve 51 approximately simultaneously though this is not critical to the invention. It will be observed that the cam 16 is designed to retain switch 19 in a closed condition for a slightly longer period than switch 17, it being understood that the valve 61 will dispense the required amount of coffee G very quickly.

Cam 15 and switch 18 control the operation of solenoid 39 which when actuated opens the flap valve 36 over the discharge port 35. Precise timing of this valve is not particularly critical, in view of the fact it is not responsible for controlling amounts of flow. Its primary purpose is to prevent spillage of liquid coffee L out the port 35 when the machine is not in operation in the event that the tank is initially overfilled or the machine is jarred to disturb the surface of the body of coffee L. Cam 15 is set, however, to close switch 18 and open the valve 36 approximately simultaneously with the other valves and to retain the port 35 open for a considerable period after valves 51 and 61 have been closed.

Operation of the invention will now be understood. The receptacle 21 is initially filled with the preselected proportions of ground coffee G and hot water to a level just below the receptacle discharge port 28. This may be accomplished either by removing the receptacle from the machine or by continuously repeating the tank replenishing operation now to be described. Assuming the tank to be filled to its normal operating level shown in Fig. 2 the machine is called upon to deliver a cup of coffee by energizing the motor 11 for one revolution of the shaft 12. This may be effected by a switch controlled by a coin receiving mechanism or by a manual control, either of which combinations are old in the art.

As the cams 14 and 16 respectively close the switches 17 and 19 the circuits to solenoid 70 and valve 51 are closed for the proper time period so that approximately a cup of hot water and the necessary amount of ground coffee to be infused thereby for a palatable coffee brew are discharged respectively through line terminal 50 and spout 60 into the tank ingredient receiving chimney or chamber 33. This immediately raises the liquid level in the chambers 33 and 32, the level in the intermediate portion of the tank being retained by the bottom wall 30 of the cover member 29 which extends between the front and rear walls of the tank.

Valve 36 has also been opened by switch 18 and the coffee L rising in chamber 32 will flow out through the port 35 into the receptacle 41 and tube 42 to be received in a cup or other beverage container. Inasmuch as the tank 21 is filled to the overflow port level prior to the operation the addition of a cup of water to the liquid body in the tank will result in the dispensing of an equal amount of coffee L from the tank through the port. The cover member 29 serves as a barrier to prohibit the discharge of the newly added water during the same operation. The screen 45 prohibits the admission of any coffee grounds G into the area adjacent the discharge port.

It is found preferable to retain the body of coffee L in the tank 21 at a temperature in the range of 150° to 165° F. This temperature range is high enough to brew the coffee and yet low enough to retain caffeine and certain volatic aromatic oils in the coffee which normally evaporate at high temperatures. A conventional bi-metal thermostat 76 having connection with a switch to the heater 26 is mounted on a wall of the tank 21 to maintain the coffee at the desired temperature. The hot water admitted to the tank through line 50 is preferably at a temperature somewhat higher than the temperature of the coffee L. This is to compensate for the cooling effect of the grounds G and to assure maintenance of the liquid L at the desired minimum temperature even when the apparatus is at a peak load, discharging several cups per minute.

The body of liquid coffee L in the tank 21 is, of course, many times greater in volume than the cup of water introduced during each operation of the device. Accordingly the water introduced has only a very slight diluting effect on the brew in the tank and then only briefly during the infusion of the newly added ground coffee G. Accordingly in normal operation of the device the strength of the brew dispensed from the tank is found to remain very constant.

The drain tube 42 may lead to a mixing bowl for the addition of cream or sugar or both to the coffee discharged from the tank prior to its reception in a cup or other container. It is important to note that the screen 44 is spaced sufficiently from the adjacent side wall of the tank to allow its filtering function to be distributed over its entire area below the cover member. This prevents rapid clogging such as would occur should the screening 45 be placed only over the discharge opening 28. A considerable portion of the grounds G remain in suspension in the coffee brew, particularly during frequent operation of the apparatus and the filter 44 effectively prevents the carrying off of these grounds with the coffee discharged from the tank.

When the temperature of the liquid coffee L in tank 21 is maintained in the range of 150° to 165° F., as hereinbefore brought out, the "used" grounds G in the tank remain inert so as not to contaminate or destroy the flavor of the liquid coffee, even when the grounds are left in the tank for an extended period of time.

The circuit to the solenoid 70 preferably carries alternating current as the armature 71 will vibrate more effectively when the solenoid is so energized. The other electrically actuated devices in the apparatus may be operated by either direct or alternating current.

The apparatus herein described has been found to produce a coffee brew wherein the most desirable flavor qualities have been retained due to the use of the well known pan method of coffee infusion. Moreover it provides a means for automatically carrying out the method and preserving and dispensing the brew on a volume basis. It accordingly economically and effectively carries out the aforementioned objectives.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a coffee making apparatus the combination with a supporting framework, of a liquid containing open top tank mounted on the framework, a cover member on the tank covering only a portion of the open top of the tank and having a portion extending downwardly into said tank below the normal liquid level therein to afford a liquid barrier, said portion being of sufficient width and breadth as to leave a pair of substantially spaced upwardly opening chimneys in the upper portion of the tank, the tank having a discharge therein opening into one of said chimneys at a point about the lower edge of said barrier, a hot water supply source and a ground coffee supply bin on the framework, and means for discharging hot water from said source and ground coffee from said bin downwardly into the other of said chimneys.

2. In a coffee making apparatus, a coffee infusion tank comprising an open top liquid containing receptacle, a removable cover for the receptacle, said cover being smaller in area than the top opening of the receptacle to cover only a portion thereof but having substantial depth, width and breadth whereby when the cover is placed in a central position over the receptacle the cover projects downwardly below the normal liquid level in said receptacle and in conjunction with the walls of the receptacle provides a pair of horizontally spaced vertically extending chimneys within the upper portion of the receptacle, said receptacle having a discharge therein opening one of said chimneys directly to the exterior of the receptacle above the bottom of said cover, means for heating the receptacle, means operable to deposit water and ground coffee into the receptacle from above through the other chimney, and a filter screen removably positioned within the receptacle and completely separating the chimneys from each other.

3. In a coffee making apparatus, a coffee infusion tank, means operable to deposit water and ground coffee from above into one area of said tank, means operable to discharge liquid from another area of said tank, a liquid barrier extending downwardly into said tank below said discharge means, and extending across said tank, in position to horizontally space said areas from each other a distance greater than the major portion of the horizontal width of said tank, and filter means in said tank completely separating said areas from each other below said barrier to thereby prevent said ground coffee from passing from said one area to said discharge means.

4. The combination as defined in claim 1, and in which said means for discharging said ground coffee includes means for vibrating the ground coffee to be discharged.

5. The combination as defined in claim 1, and in which said bin has a discharge opening therein, and in which said means for discharging said ground coffee includes a valve member movable between open and closed positions to thereby open and close said discharge opening, a solenoid connected to said valve member for moving said valve member between said positions, and bumper means on said solenoid for vibrating said valve member upon movement thereof to said open position.

References Cited in the file of this patent

UNITED STATES PATENTS

| Re. 22,879 | Peters et al. | May 13, 1947 |
| 550,033 | Wheeler | Nov. 19, 1895 |
| 769,584 | Barber et al. | Sept. 6, 1904 |
| 904,113 | Blocker | Nov. 17, 1908 |
| 1,000,326 | Crofford | Aug. 8, 1911 |
| 1,305,822 | Madsen | June 3, 1919 |
| 1,364,435 | Harris | Jan. 4, 1921 |
| 1,416,899 | Sirch | May 23, 1922 |

(Other references on following page)

UNITED STATES PATENTS

| | | |
|---|---|---|
| 1,470,584 | Kreutz | Oct. 9, 1923 |
| 1,508,809 | White | Sept. 16, 1924 |
| 1,668,540 | McAllen | May 1, 1928 |
| 1,837,368 | Medin | Dec. 22, 1931 |
| 1,922,782 | Schallis | Aug. 15, 1933 |
| 2,139,881 | Comstock | Dec. 13, 1938 |
| 2,149,270 | Burgess | Mar. 7, 1939 |
| 2,270,616 | Bell | Jan. 20, 1942 |
| 2,626,785 | Lewis et al. | Jan. 27, 1953 |
| 2,694,555 | Sinkwich | Nov. 16, 1954 |
| 2,730,034 | Svendsgaard | Jan. 10, 1956 |

FOREIGN PATENTS

| | | |
|---|---|---|
| 36,885 | Sweden | June 3, 1914 |
| 341,581 | Great Britain | Jan. 22, 1931 |
| 441,946 | Italy | Apr. 10, 1947 |
| 479,313 | Italy | Mar. 28, 1953 |